United States Patent [19]

Colter et al.

[11] 4,031,029

[45] June 21, 1977

[54] PROCESS FOR PRODUCING URANIUM OXIDE RICH COMPOSITIONS FROM URANIUM HEXAFLUORIDE USING FLUID INJECTION INTO THE REACTION ZONE

[75] Inventors: John Cecil Colter, Wilmington, N.C.; Dean B. James, Saratoga, Calif.; Walter Gill Keith; Reza Akbari-Kenari, both of San Jose, Calif.

[73] Assignee: General Electric Company, San Jose, Calif.

[22] Filed: July 2, 1975

[21] Appl. No.: 592,508

[52] U.S. Cl. .................. 252/301.1 R; 423/19; 423/260; 423/261
[51] Int. Cl.² .................................. C01G 43/02
[58] Field of Search .............. 252/301.1 R; 423/19, 423/260, 261

[56] References Cited

UNITED STATES PATENTS

| 3,672,341 | 6/1972 | Smith et al. | 123/25 C |
| 3,790,493 | 2/1974 | Dada et al. | 252/301.1 R |

OTHER PUBLICATIONS

Obert, E. "Detonation and Internal Coolants" *SAE Quarterly Transactions*, Jan. 1948, vol. 12, No. 1, pp. 52–59.

*Primary Examiner*—Benjamin R. Padgett
*Assistant Examiner*—Deborah L. Kyle
*Attorney, Agent, or Firm*—Ivor J. James, Jr.; Sam E. Laub; Samuel E. Turner

[57] ABSTRACT

An improved process for the conversion of gaseous uranium hexafluoride to a uranium oxide rich composition in the presence of an active flame in a reaction zone is achieved by introducing a first gaseous reactant comprising a mixture of uranium hexafluoride and an oxygen-containing carrier gas and a second gaseous reactant comprising a reducing gas, the reactants being separated by a shielding gas as introduced to the reaction zone. The shielding gas temporarily separates the gaseous reactants and temporarily prevents substantial mixing and reacting of the gaseous reactants. The flame occurring in the reaction zone is maintained away from contact with the inlet introducing the mixture to the reaction zone. The process also includes introducing an oxygen-containing gas as a third gaseous reactant at a time when the uranium hexafluoride conversion to uranium dioxide is substantially complete resulting in oxidizing the uranium oxide composition to a higher oxide of uranium and conversion of the residual reducing gas to its oxidized form. During the process there is practiced the improvement of introducing an atomized fluid having a high latent heat of evaporation so that the atomized fluid directly enters the reaction zone and the introduction can be made at a location so that the atomized fluid enters the primary flame, the secondary flame, or both the primary and secondary flames, or downstream from the secondary flame. The atomized fluid can be introduced alone or with a carrier gas such as an oxygen-containing gas.

20 Claims, 6 Drawing Figures

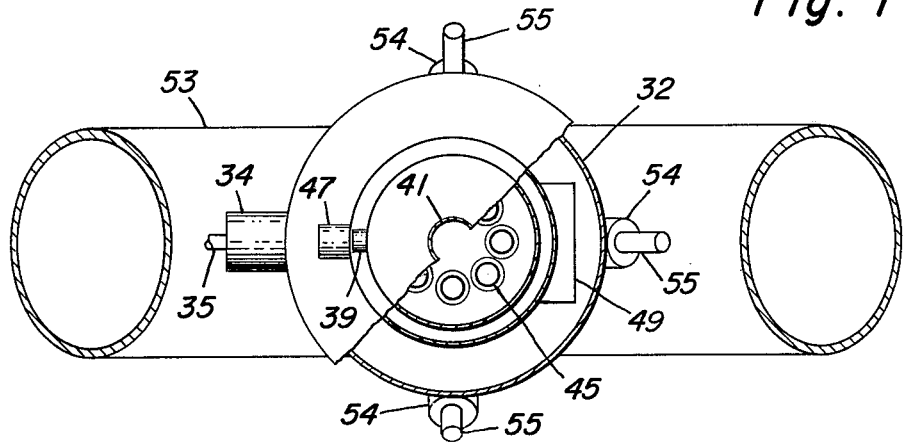

PROCESS FOR PRODUCING URANIUM OXIDE RICH COMPOSITIONS FROM URANIUM HEXAFLUORIDE USING FLUID INJECTION INTO THE REACTION ZONE

BACKGROUND OF THE INVENTION

Oxide products of uranium have various utilities including a preferred utility as neculear fuels for neculear reactors.

The performance of the fuel elements, traditionally enriched uranium dioxide structures clad in a metal container, is crucial to the practical success of the nuclear reactor. Nuclear power generation has imposed severe requirements on the performance of fuel in neclear reactors, especially on properties of grain size and density of the fuel. It has been demonstrated that fine grain uranium dioxide structures are more subject to creep than large grain uranium dioxide structures. It has also been discovered that the density of the uranium dioxide is a very important physical property influencing the performance of the fuel. In fabricated forms, uranium dioxide is a ceramic capable of compaction to give a structure of desired density and a low impurity level.

The enrichment of uranium customarily takes place through use of the compound uranium hexafluoride so that a process is required for converting the enriched uranium hexafluoride into enriched uranium dioxide in a form which can be readily fabricated to structures having a low fluoride content and a desired density and grain size.

One current practice for converting uranium hexafluoride to an oxide product of uranium, usually uranium dioxide, employs hydrolysis of uranium hexafluoride to give a solution of uranyl fluoride and hydrogen fluoride from which ammonium diuranate is precipitated by the addition of ammonia. After filtration the ammonium diuranate of high fluoride content is dissolved in nitric acid with fluoride decontamination of the resulting uranyl nitrate solution being accomplished by solvent extraction. From the resulting purified uranyl nitrate solution, ammonium diuranate is reprecipitated and then calcined to give $U_3O_8$ which in turn is reduced with hydrogen to give uranium dioxide.

Attempts have been made to replace this involved, expensive ammonium diuranate conversion process by gas phase reaction of uranium hexafluoride with a very successful method being described in U.S. Pat. No. 3,796,672 entitled "Process for Producing Uranium Dioxide Rich Compositions from Uranium Hexafluoride" which is hereby incorporated by reference. This patent is in the names of W. R. DeHollander and A. G. Dada and is assigned to the same assignee as the present invention. This patent discloses a process for the conversion of gaseous uranium hexafluoride to a uranium dioxide rich composition in the presence of an active flame in a reactor defining a reaction zone by separately introducing a gaseous reactant comprising a reducing gas and a gaseous reactant comprising a mixture of uranium hexafluoride and an oxygen-containing carrier gas, the reactants being separated by a shielding gas as introduced to the reaction zone. The shielding gas temporarily separates the gaseous reactants and temporarily prevents substantial mixing and reacting of the gaseous reactants until sufficient cross diffusion occurs. The practice of the process of U.S. Pat. No. 3,796,672 gives a uranium dioxide rich composition having particularly desirable properties and a gaseous atmosphere rich in reducing gas such as hydrogen. Since it is known that certain gaseous mixtures of a reducing gas such as hydrogen and air can be readily combustible and potentially explosive, it has been found desirable to convert any such gaseous mixture to its oxidized form during this process.

U.S. Pat. No. 3,790,493 entitled "Post Oxidation Process for Uranium Dioxide Rich Compositions" covers a process having the improvement of introducing an oxygen-containing gas as a third gaseous reactant at a time when the uranium hexafluoride conversion to the uranium dioxide rich composition is substantially complete. This results in oxidizing the uranium dioxide rich composition to a higher oxide of uranium with conversion of the residual reducing gas to its oxidized form. This patent in the names of Abdul G. Data, W. R. DeHollander and Robert J. Sloat is assigned to the same assignee as the present invention and is hereby incorporated by reference.

Another very successful method of replacing the ammonium diuranate conversion by gas phase reaction of uranium hexafluoride is described in copening U.S. Pat. application Ser. No. 387,529 entitled "Process for Producing Uranium Oxide Rich Compositions from Uranium Hexafluoride" which is hereby incorporated by reference. This patent application was filed Aug. 10, 1973 in the names of W. R. DeHollander and C. P. Fenimore and is assigned to the same assignee as the present invention. This process gives the conversion of gaseous uranium hexafluoride to a uranium oxide rich composition in the presence of an active flame in a reactor defining a reaction zone by separately introducing a first gaseous reactant comprising a mixture of uranium hexafluoride and a reducing carrier gas and a second gaseous reactant comprising an oxygen-containing gas, the reactants being separated by a shielding gas as introduced to the reaction zone. The shielding gas temporarily separates the gaseous reactants and temporarily prevents substantial mixing and reacting of the gaseous reactants. The flame occurring in the reaction zone is maintained away from contact with the inlet introducing the mixture to the reaction zone.

In operation of any of the processes of U. S. Pats. Nos. 3,976,672 and 3,790,493 and U. S. Pat. application Ser. No. 387,529, it is desirable to connect the reaction zone with a powder collection apparatus, such as the apparatus disclosed in copending U.S. Pat. application Ser. No. 396,874 filed Sept. 12, 1973. This application entitled "Apparatus and Method for Collecting Particulate Material from a Gas Stream" was filed in the names of W. R. DeHollander, R. J. Sloat, W. R. Becker and A. G. Dada and is hereby incorporated by reference. This application directs the particulate (uranium oxide) containing gas stream into conduits housing filters which separate the particulate material from the gas stream with exhausting of the gas stream. The particulate material is then blown from the filters by a high pressure back flushing with a gas stream for collection of the particulate material in a container connected to the conduit. In practice it has been found that the filters used in apparatus for collecting the particulate material from a gas stream encounter very high temperatures such as temperatures in the range of 450° to 500° C. Porous metal filters such as Monel metal filters have been found to have limited life at such temperatures with a typical failure rate occurring between 200 to 400 hours of operation. Accordingly it is recognized that it would be desirable to minimize the temperature of the gases encountered by the filters in the apparatus for collecting particulate material from a gas stream, and this is one of the objectives of this invention. At reduced temperature, the operating life of the metal filters is greatly enhanced and the type of filters capable of being utilized in this apparatus is expanded.

SUMMARY OF THE INVENTION

It has now been discovered that a gas phase reaction for converting uranium hexafluoride to uranium oxide, in combination with powder collection using a filtering step and a back pulsing step with gas to blow the powder from the filters, can be conducted in a manner to expose the filters to a much lower operating temperature through the step of introducing an atomized fluid having a high latent heat of evaporation into the reaction zone in a manner so that there is substantially no condensation of the fluid on the apparatus defining the reaction zone or the apparatus defining the powder collection zone for collecting the particulate material, and powder build up in, or plugging of these apparatuses is not encountered. The atomized fluid is preferably selected from those fluids having a high latent heat of evaporation with a preferred fluid being water, especially deionized water. This step has the introduction of the atomized fluid in the primary flame, or the secondary flame, or both the primary and secondary flames, or downstream from the secondary flame. The atomized fluid can be introduced alone or with a carrier gas such as an oxygen-containing gas. This step also minimizes the occurrence of any wetting of the powder, thus preventing build up of the powder in the reaction zone or the filtering zone.

OBJECTS OF THE INVENTION

It is an object of this invention to provide for injection of a fluid having a high latent heat of evaportion in an atomized form directly into the reaction zone during the conversion of uranium hexafluoride to a uranium oxide rich composition.

It is another object of this invention to achieve a process of converting uranium hexafluoride to a uranium oxide rich composition in a reaction zone in which the improvement of introducing a fluid having a high latent heat of evaporation in atomized form enters the primary flame or the secondary flame of the conversion reaction or both the primary flame and the secondary flame of the conversion reaction or downstream from the secondary flame.

Other objects and advantages of this invention will become apparent to a person skilled in the art from a reading of the following summary, description of the invention and the appended claims and by reference to the accompanying drawings described immediately hereinafter.

DESCRIPTION OF THE DRAWINGS

FIGS. 1 and 2 show respectively a top view partially cut away and a sectional side view of the upper portion of a reactor for conducting one process of converting uranium hexafluoride to a uranium oxide rich composition, and the reactor has means for introducing an atomized fluid having a high latent heat of evaporation for cooling the reaction products in the primary flame in the reaction zone.

DETAILED DESCRIPTION OF THE INVENTION

Figure 3:
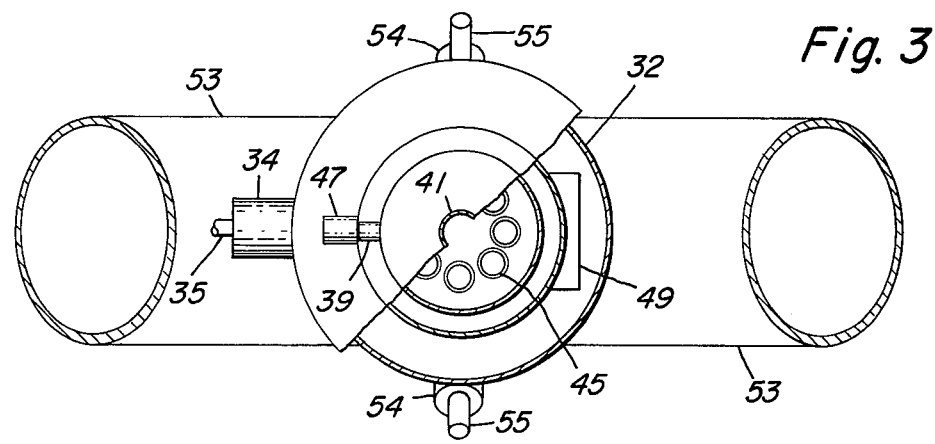
FIGS. 3 and 4 show respectively a top view partially cut away and a sectional side view of the upper portion of a reactor for conducting another process of converting uranium hexafluoride to a uranium oxide rich composition and the reactor has means for introducing an atomized fluid having a high latent heat of evaporation for cooling the reaction products in the secondary flame in the reaction zone.

The foregoing objects have been accomplished in a new process for thermal conversion of gaseous uranium hexafluoride to a uranium oxide rich composition in the presence of an autogenous flame in a reaction zone which separately receives a mixture of uranium hexafluoride and an oxygen-containing carrier gas as a first gaseous reactant, a reducing gas as a second gaseous reactant, a shielding gas temporarily separating the first and second gaseous reactants from one another and temporarily preventing substantial mixing and reaction of the first and second gaseous reactants, and an oxygen-containing gas as a third reactant introduced in the reaction zone at a time and position such that the reaction between the first and second gaseous reactants is substantially complete. The shielding gas temporarily prevents the reducing gas from diffusing into the uranium hexafluoride-carrier gas mixture and also prevents diffusion of the uranium hexafluoride-carrier gas mixture into the reducing gas until the mixture has moved away from the inlet zone through which the gas mixture is introduced into the reaction zone. After a brief delay, sufficient cross diffusion of the reactants through the shielding gas occurs and the flame reaction occurs between the uranium hexafluoride, the oxygen-containing gas (and the carrier gas if the carrier gas is not an inert gas) and the reducing gas. This reaction produces a transient particulate uranium dioxide rich composition and gaseous by-products including residual reducing gas. The third gaseous reactant, an oxygen-containing gas, reacts with the particulate uranium dioxide rich composition and the gaseous by-products yielding a particulate uranium oxide rich composition and converting any reducing gas to its oxidized form. The particular uranium oxide formed depends on the ratio of the molar volume of the third gaseous reactant and the molar volumes of the transient particulate uranium dioxide rich composition and the residual reducing gas. During practice of this process, there is conducted the improvement step of introducing an atomized fluid having a high latent heat of evaporation so that the atomized fluid directly enters the reaction zone and the introduction can be made at a location so that the atomized fluid enters the primary flame, the secondary flame, or both the primary and secondary flames, or downstream from the secondary flame. This minimizes the occurrence of any condensation of the fluid or wetting of the powder, thus preventing build up of the powder in the reaction zone or downstream from the reaction zone. This step enables a significant reduction in the temperature of the reaction products leaving the reaction zone, and when filters are employed for filtering the particulate uranium oxide rich composition, the filters have a much longer operting life due to the reduced temperature of the reaction products coming in contact with the filters.

In another embodiment of the process of this invention, there is conducted the thermal conversion of gaseous uranium hexafluoride to a uranium oxide rich composition in the presence of an autogenous flame in a reaction zone which separately receives a mixture of uranium hexafluoride and a reducing carrier gas as a first gaseous reactant, an oxygen-containing gas as a second gaseous reactant, and a shielding gas (shield gas) temporarily separating the first and second gaseous reactants from one another and temporarily preventing substantial mixing and reaction of the gaseous reactants, and an oxygen-containing gas as a third gaseous reactant introduced in the reaction zone at a time and position such that the reaction between the first and second gaseous reactants is substantially complete. The shielding gas temporarily prevents the oxygen-containing gas from diffusing into the uranium hexafluoride-carrier gas mixture and also temporarily prevents diffusion of the uranium hexafluoride-carrier gas mixture into the oxygen-containing gas until the mixture has moved away from the inlet zone through which the uranium hexafluoride-carrier gas mixture is introduced into the reaction zone. After a brief delay, sufficient cross diffusion of the reactants through the shielding gas occurs and a flame reaction occurs between the uranium hexafluoride, the oxygen-containing gas (and the carrier gas if the carrier gas is not an inert gas) and the reducing gas. This reaction produces a transient particulate uranium dioxide rich composition and gaseous by-products including residual reducing gas. The third gaseous reactant, an oxygen-containing gas, reacts with the particulate uranium dioxide rich composition and the gaseous by-products yielding a particulate uranium oxide rich composition and converting any reducing gas to its oxidized form. The particular uranium oxide formed depends on the ratio of the molar volume of the third gaseous reactant and the molar volumes of the transient particulate uranium dioxide rich composition and the residual reducing gas. During practice of the process, there is conducted the improvement step of introducing as atomized fluid having a high latent heat of evaporation so that the atomized fluid directly enters the reaction zone and the introduction can be made at a location so that the atomized fluid enters the primary flame, the secondary flame, or both the primary and secondary flames, or downstream from the secondary flame. This minimizes the occurrence of any condensation of the fluid or wetting of the powder, thus preventing build up of the powder in the reaction zone or downsteam from the reaction zone. This step enables a significant reduction in the temperature of the reaction products leaving the reaction zone, and when filters are employed for filtering the particulate uranium oxide rich composition, the filters have a much longer operating life due to the reduced temperature of the reaction products coming in contact with the filters.

Referring now to FIGS. 1 and 2 there is presented an apparatus using two concentric outer tubes 33 and 38. Attached to tube 33 is vibration means 49 which during operation vibrates the nozzle generally designated 30 and the reactor vessel 32. The nozzle 30 is mounted and sealed by seals 37 in a supporting means such as cover 31 which forms an air tight seal (which can be disconnected) with reaction vessel 32 defining a reaction zone 29. Vessel 32 has an outwardly protruding space 34 which holds a pilot burner 35 which receives gas and maintains a pilot flame 36 to initiate a flame reaction.

The nozzle 30 has a first inlet means in the form of tube 33 with tubular inlets 47 for introduction of a fluid reactant and a second inlet means in the form of tube 38 with two tubular inlets 39 for introduction of another fluid. Tube 38 has a cover 40 with an opening for a tubular inlet 41 for introduction of a fluid. A third inlet means is disposed in tube 38 in the form of tubular chamber 43 defining a volume 42 for receiving fluid from inlet 41. Chamber 43 has eight openings in the portion 44 of size equal to the external diameter of tubes 45 which are connected to portion 44 of chamber 43 such as by welding or threading so that tubes 45 receive the fluid from chamber 43. Tubes 33 and 38 extend further into the reaction zone 29 than tubes 45 by the distance generally designated $d$. A directional control plate 46 is secured transversely in the lower portion of tube 38 at a distance $l$ above the open ends of tubes 45 and this plate is provided with openings through which tubes 45 extend. The plate 46 coaxially forms an annular opening around each tube 45, and plate 46 forces the shielding fluid in tube 38 to pass through the annular openings and then into the reaction zone 29 surrounding the jets of fluid reactant from tubes 45. The relation between the size of the holes in the plate and the thickness of the plate 46 is such that the shielding fluid passes between the plate 46 and the tubes 45 in approximately unidirectional flow toward the reaction zone 29.

Four atomizing means 54 each with feed lines 55 for feeding the atomizing means 54 are positioned in openings in reactor vessel 32 so that the openings in atomizing means 54 point in a downstream direction in the reaction zone 29. The four atomizing means are positioned at 90 degree intervals in the openings in the reactor vessel 32 and these introduce the atomized fluid directly into the primary flame 48 without touching or wetting the reactor vessel 32. Tubular members (inlets) 53 are joined with vessel 32 at an angle to vessel 32, generally about a 45 degree angle. The tubular members 53 are mounted so that the incoming third gaseous reactant enters the reaction zone 29 at the point when the uranium hexafluoride conversion to the transient particulate uranium dioxide rich composition is substantially complete.

In a preferred use of the nozzle of this invention for conversion of uranium hexafluoride to a uranium oxide rich composition, a continuous flow of a reactant comprising a reducing gas selected from the group consisting of hydrogen, dissociated ammonia and mixtures thereof is maintained in tube 33 into the reaction zone 29 throughout the reaction so that there is a strong reducing atmosphere generally maintained in the reaction zone 29. A shielding gas is fed through inlets 39 and tube 38 into the reaction zone 29. The shielding gas can be a non-reactive gas selected from the group consisting of nitrogen, argon, helium, neon, krypton, xenon and mixtures thereof or the shielding gas can be a reactive gas selected from the group consisting of oxygen, air or a mixture thereof, or either air, oxygen or a mixture of air and oxygen with any of the foregoing non-reactive gases. A reactant comprising a mixture of uranium hexafluoride and an oxygen-containing carrier gas is fed through inlet 41, chamber 43 and tubes 45 into reaction zone 29 in the direction of the arrow in inlet 41. The oxygen-containing carrier gas is selected from the group consisting of oxygen, air and mixtures thereof. The flows of the gases in tubes 38 and 45 occur so that the shielding gas in tube 38 surrounds the jets of gaseous reactant coming from tubes 45 as the gases enter the reaction zone 29. The shielding gas shields the mixture of uranium hexafluoride and the oxygen-containing carrier gas from the reducing gas for sufficient time so that the boundary of initiation of the reaction (primary) flame 48 in the reaction zone 29 is removed from contact with tube 38 and this is referred to as a "lifted flame". The reaction results in a bright orange flame. A fluid having a high latent heat of evaporation is introduced in atomized form through atomizing means 54 so that the atomized fluid directly enters the primary flame 48 and serves to cool the reaction products of this flame 48 by the evaporation of the atomized fluid. The oxygen-containing gas as a third gaseous reactant is introduced into the reaction zone 29 through tubular members 53 so that the third reactant mixes with the reaction products of the primary flame 48. This results in formation of a secondary flame 52 due to the burning of the residual reducing gas to form its oxidized product and the conversion of the uranium dioxide rich composition to a composition rich in uranium oxides. The tubular members 53 are mounted so that the incoming third reactant enters the reaction zone at the point where the uranium hexafluoride conversion to the transient particulate uranium dioxide rich composition is substantially complete.

Figure 4:
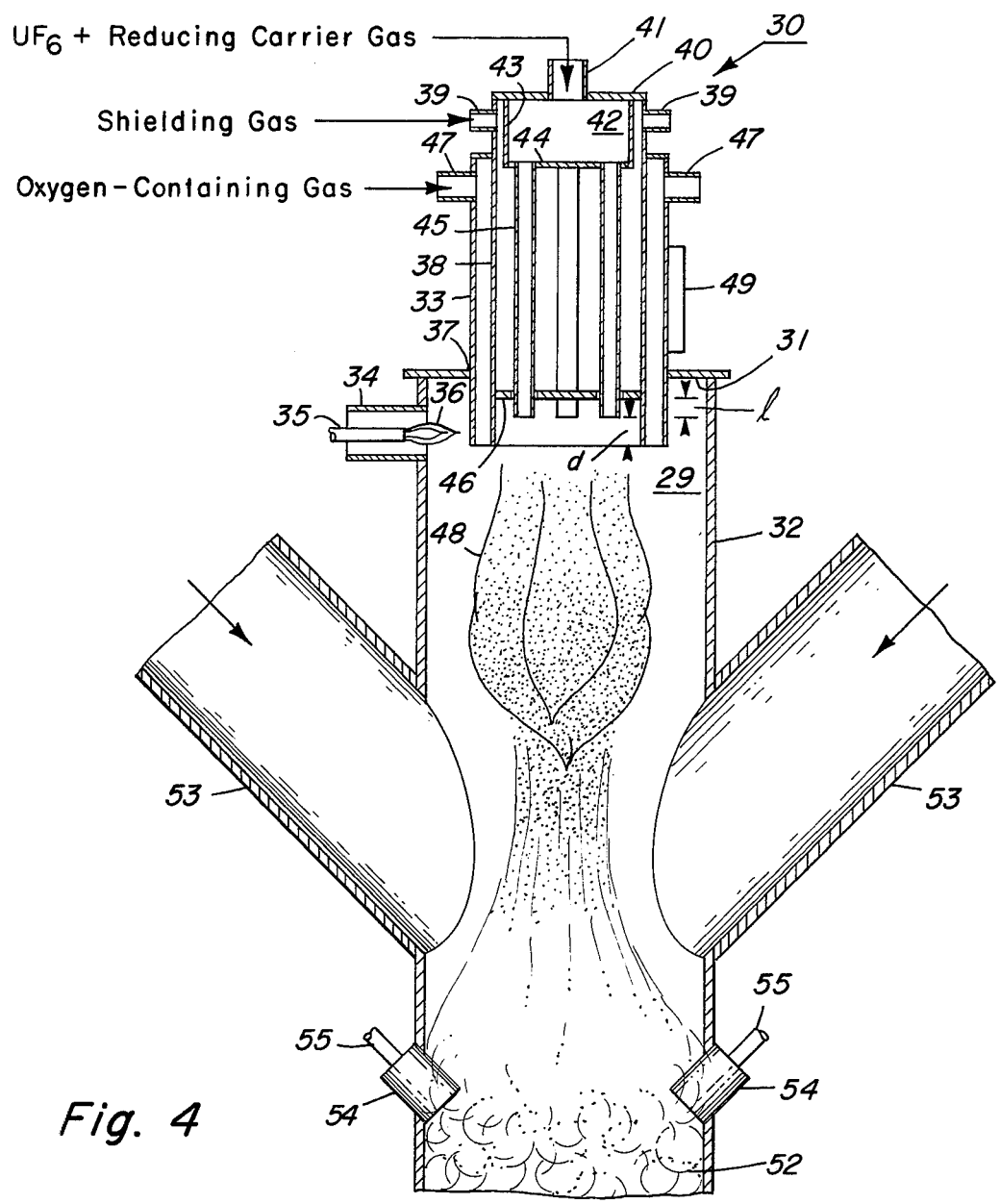

Still another embodiment of this invention is presented in FIGS. 3 and 4 with the same reference numbers being used to identify the same components as in FIGS. 1 and 2. In this embodiment inlet 41 receives the gaseous reactant of a mixture comprising uranium hexafluoride and a reducing carrier gas, the inlets 39 receive the shielding gas and the inlets 47 receive the oxygen-containing gas. The introduction of the third gaseous reactant is at a time and place where the uranium hexafluoride conversion to a uranium dioxide rich composition is substantially complete. In FIG. 4 this position is shown as being near the tip of primary flame 48. An oxygen-containing gas as the third gaseous reactant is fed in inlets 53 so that it enters the reaction zone 29 and mixes with the reaction products. This results in a secondary flame 52 from the burning of the residual reducing gas to its oxidized product form and the conversion of the uranium dioxide rich composition to a composition rich in uranium oxide (s) having some oxide in a higher oxygen content than uranium dioxide. The following are representative of such uranium oxide (s): uranium tritaoctoxide ($u_3O_8$), uranium pentoxide ($u_2O_5$), $U_4O_9$ and mixtures of any of the foregoing with or without some uranium dioxide ($UO_2$). A fluid having a high latent heat of evaporation is introduced in atomized form through four atomizing means 54 fed by lines 55 so that the atomized fluid directly enters the secondary flame 52 and serves to cool the reaction products of this flame 52 by evaporation of the atomized fluid. Again there are four atomizing means positioned at 90° intervals in the openings in reactor vessel 32 and these introduce the atomized fluid directly into the secondary flame 52 without touching or wetting the reactor vessel 32.

The junction of tubular members 53 with vessel 32 in FIGS. 1–4 approximately divides the reaction zone 29 into (1) a primary reaction zone with primary flame 48 including generally the space toward nozzle 30 from the junction of tubular members 53 with reactor vessel 32 and (2) a secondary reaction zone with secondary flame 52 including generally the space below the junction of tubular members 53 with reactor vessel 32.

Figure 5:
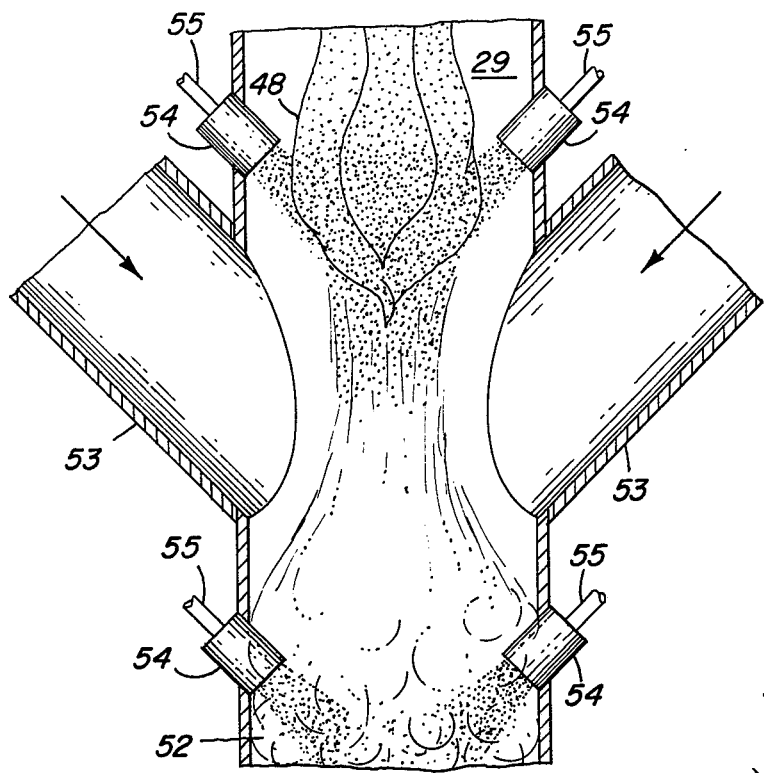
FIG. 5 presents a sectional side view of the portion of the reactor of FIGS. 1-4 having the primary and secondary flames in a process of converting uranium hexafluoride to a uranium oxide rich composition and the reactor has means for introducing an atomized fluid having a high latent heat of evaporation for cooling the reaction products in the primary and secondary flames in the reaction zone.

A further embodiment of this invention is presented in FIG. 5 which shows only the portion of the reactor vessel 32 which has the primary flame 48 and the secondary flame 52. Here a fluid having a high latent heat of evaporation is introduced in atomized form through two sets of four atomizing means 54 fed by lines 55 at two general locations so that the atomized fluid directly enters the primary flame 48 at one general loaction and the secondary flame 52 at the other general location. This serves to cool the reaction products of the primary flame 48 and the secondary flame 52 and the total amount of the atomized fluid introduced in divided between these two locations. There are four atomizing means positioned at 90 degree intervals in the openings in the reactor vessel 32 near the primary flame 48 and in the openings in the reactor vessel near the secondary flame 52.

Figure 6:
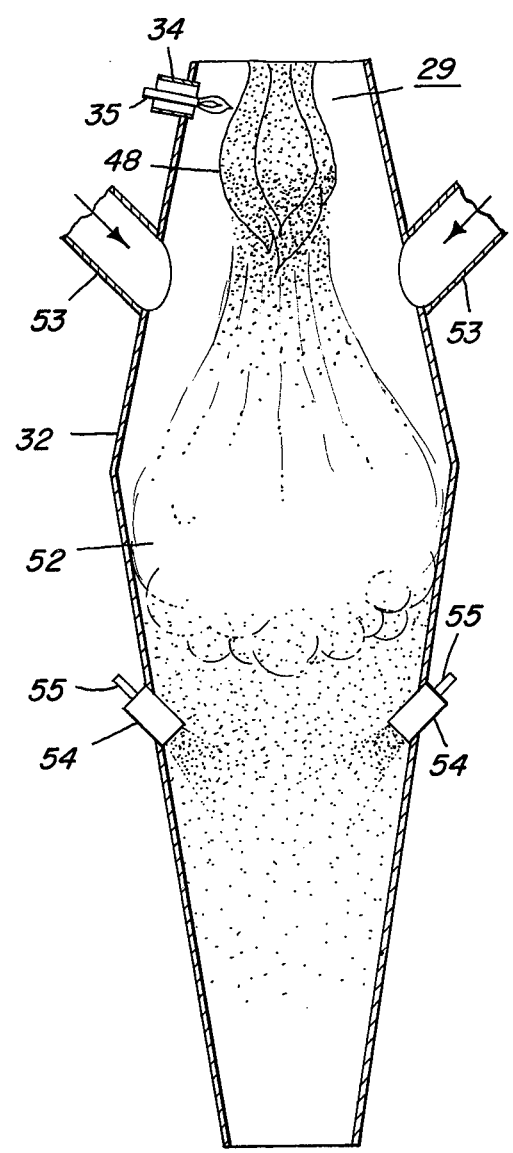
FIG. 6 presents a sectional side view of the portion of another reactor having the primary and secondary flames in a process of converting uranium hexafluoride to a uranium oxide rich composition, and the reactor has means for introducing and atomized fluid having a high latent heat of evaporation for cooling the reaction products at a location downstream from the secondary flame in the reaction zone.

A particularly preferred embodiment is presented in FIG. 6 which shows only the portion of the reactor vessel 32 which has the primary flame 48 and the secondary flame 52. Here the reactor vessel is in the form of two truncated cones that have been joined at their bases. Here a fluid having a high latent heat of evaporation is introduced in atomized form through atomizing means 54 fed by lines 55 at a position downstream from the secondary flame 52 (or at a position further form the nozzle 30 than flame 52 as shown in FIGS. 1–4. This serves to cool the reaction products of the secondary flame 52. There are four atomizing means positioned at 90 degree intervals in the openings in the reactor vessel 32 at the position downstream from the secondary flame 52.

A particularly preferred fluid for introduction in atomized form to the reaction zone is water, particularly deionized water. In addition liquid carbon dioxide and liquid nitrogen can be used. The fluid should have the properties of a high latent heat of evaporation, not react with or affect the properties of the particulate uranium oxide rich composition and not form deposits or films on the particulate uranium oxide rich composition. The key to successful use of this technique is to achieve complete evaporation of the fluid before the powder contacts the filters of the reactor vessel or other components of the apparatus. The fluid injection is conducted for FIGS. 1–5 so that there is no quenching of either the primary or secondary flames (depending on the particular embodiment). For FIG. 6, the fluid injection is conducted so that there is complete evaporation of the injected fluid, but also so that the particulate uranium oxide rich composition is not moistened, thus avoiding caking or the build up of deposits.

High pressure fluid of at least about 300 pounds per square inch or higher is preferably used as an input to the atomizing means 54, and this contributes to increasing the rate of evaporation of the atomized fluid thereby minimizing the possibility of local condensation. In addition gas pressure such as from an inert gas can be used to drive the fluid through the atomizing means 54 into the reaction zone and a preferred gas would be nitrogen. In addition the atomization is conducted to give very fine, well dispersed droplets for introduction into the reaction zone.

It is to be understood that, although the invention has been described with specific references to particular embodiments thereof, it is not to be so limited, since changes and alterations therein may be made which are within the full intended scope of this invention as defined by the appended claims.

What is claimed is:

1. In the method of preparing a uranium oxide rich composition from uranium hexafluoride in a reaction zone in the presence of an active flame comprising the steps of introducing a first gaseous reactant comprising a mixture of uranium hexafluoride and an oxygen-containing carrier gas into the reaction zone, separately introducing a second gaseous reactant comprising a reducing gas into the reaction zone and separately introducing a shielding gas into the reaction zone between the first gaseous reactant and the second gaseous reactant which temporarily prevents substantial mixing and reaction between the first gaseous reactant and the second gaseous reactant until sufficient cross diffusion of the reactants and the shielding gas occurs as the reactants and the shielding gas pass through the reaction zone, resulting in a reaction forming a primary flame and producing a particulate uranium dioxide rich composition and gaseous reaction products, and introducing a third gaseous reactant comprising an oxygen-containing gas into contact with the particulate uranium dioxide rich composition and gaseous reaction products thereby converting the gaseous reaction products in the reaction zone in a secondary flame to an oxidized form and oxidizing the uranium dioxide rich composition to a higher oxide of uranium, the improvement comprising the step of directly introducing an atomized fluid having a high latent heat of evaporation into the reaction zone at a location in the reaction zone so that the atomized fluid is converted to a gas and cools the materials in the reaction zone.

2. The method according to claim 1 in which the atomized fluid is water.

3. The method according to claim 2 in which the water is deionized.

4. The method according to claim 1 in which the atomized fluid is introduced into the primary flame in the reaction zone at a location close to the maximum temperature in the reaction zone.

5. The method according to claim 1 in which the atomized fluid is introduced into the secondary flame in the reaction zone.

6. The method according to claim 1 in which the atomized fluid is introduced into the primary and the secondary flames in the reaction zone.

7. The method according to claim 1 in which the atomized fluid is liquid nitrogen.

8. The method according to claim 1 in which the atomized fluid is liquid carbon dioxide.

9. The method according to claim 1 in which the atomized fluid is introduced into the reaction zone at a location downstream from the secondary flame.

10. The method according to claim 1 in which the fluid being atomized is under a pressure of at least about 300 pounds per square inch.

11. In the method of preparing a uranium dioxide rich composition from uranium hexafluoride in a reaction zone in the presence of an active flame comprising the steps of introducing a first gaseous reactant comprising a mixture of uranium hexafluoride and a reducing gas into the reaction zone, separately introducing a second gaseous reactant comprising an oxygen-containing gas into the reaction zone, and separately introducing a shielding gas into the reaction zone between the first gaseous reactant and the second gaseous reactant which temporarily prevents substantial mixing and reaction between the first gaseous reactant and the second gaseous reactant until sufficient cross diffusion of the reactants and the shielding gas occurs as the reactants and the shielding gas pass through the reaction zone resulting in a reaction forming a primary flame and producing a particulate uranium dioxide rich composition and gaseous reaction products, and introducing a third gaseous reactant comprising an oxygen-containing gas into contact with the particulate uranium dioxide rich composition and gaseous reaction products thereby converting the gaseous reaction products in the reaction zone in a secondary flame to an oxidized form and oxidizing the uranium dioxide rich composition to a higher oxide of uranium, the improvement comprising the step of directly introducing an atomized fluid having a high latent heat of evaporation into the reaction zone at a location in the reaction zone so that the atomized fluid is converted to a gas and cools the materials in the reaction zone.

12. The method according to claim 11 in which the atomized fluid is water.

13. The method according to claim 12 in which the water is deionized.

14. The method according to claim 11 in which the atomized fluid is introduced into the primary flame in the reaction zone at a location close to the maximum temperature in the reaction zone.

15. The method according to claim 11 in which the atomized fluid is introduced into the secondary flame in the reaction zone.

16. The method according to claim 11 in which the atomized fluid is introduced into the primary and the secondary flames in the reaction zone.

17. The method according to claim 11 in which the atomized fluid is liquid nitrogen.

18. The method according to claim 11 in which the atomized fluid is liquid carbon dioxide.

19. The method according to claim 11 in which the atomized fluid is introduced into the reaction zone at a location downstream from the secondary flame.

20. The method according to claim 11 in which the fluid being atomized is under a pressure of at least about 300 pounds per square inch.

* * * * *